US008453584B2

(12) United States Patent
Mori et al.

(10) Patent No.: US 8,453,584 B2
(45) Date of Patent: Jun. 4, 2013

(54) METHOD FOR HANDLING SUBSTANCE FROM WHICH COMBUSTIBLE GAS VOLATILIZES, METHOD FOR PRODUCING SOLID FUEL, METHOD FOR STORING SOLID FUEL, METHOD FOR USING SOLID FUEL, AND APPARATUS FOR USING SOLID FUEL

(75) Inventors: Hirofumi Mori, Tokyo (JP); Eiji Fukuda, Itoigawa (JP); Makoto Kagamida, Tokyo (JP); Katsumi Aono, Sakura (JP)

(73) Assignee: Taiheiyo Cement Corporation, Tokyo (JP)

( * ) Notice: Subject to any disclaimer, the term of this patent is extended or adjusted under 35 U.S.C. 154(b) by 1273 days.

(21) Appl. No.: 12/224,494

(22) PCT Filed: Feb. 26, 2007

(86) PCT No.: PCT/JP2007/054122
§ 371 (c)(1),
(2), (4) Date: Oct. 9, 2008

(87) PCT Pub. No.: WO2007/100120
PCT Pub. Date: Sep. 7, 2007

(65) Prior Publication Data
US 2009/0031932 A1 Feb. 5, 2009

(30) Foreign Application Priority Data
Mar. 2, 2006 (JP) .................................. 2006-055783

(51) Int. Cl.
| F23B 90/00 | (2006.01) |
| F23G 5/00 | (2006.01) |
| F23G 5/12 | (2006.01) |
| F23D 1/00 | (2006.01) |
| B09B 3/00 | (2006.01) |

(52) U.S. Cl.
USPC ........... 110/341; 110/346; 110/347; 110/229; 110/235

(58) Field of Classification Search
USPC .................. 110/342–345, 200, 301, 218, 229, 110/233, 267, 185, 186, 303, 299, 230, 231; 201/2.5; 585/240; 208/400
See application file for complete search history.

(56) References Cited

U.S. PATENT DOCUMENTS

| 1,781,934 A | * | 11/1930 | Snyder ........................... 201/2.5 |
| 1,861,452 A | * | 6/1932 | Rusby et al. .................... 48/210 |
| 1,954,352 A | * | 4/1934 | Dornbrook et al. ........... 202/108 |

(Continued)

FOREIGN PATENT DOCUMENTS

| JP | S 54-39401 | 3/1979 |
| JP | 2-160988 A | 6/1990 |

(Continued)

OTHER PUBLICATIONS

International Search Report dated May 15, 2007 in connection with corresponding PCT application No. PCT/JP2007/054122 filed on Feb. 26, 2007.

*Primary Examiner* — Khoa Huynh
*Assistant Examiner* — Timothy K Trieu
(74) *Attorney, Agent, or Firm* — Posz Law Group, PLC

(57) ABSTRACT

A method for handling a substance from which a combustible gas volatilizes. A method for handling a substance from which a combustible gas volatilizes, in which, when such substance is handled inside an apparatus with a high degree of hermeticity, air is introduced into the apparatus and the substance is handled in a state in which the volatilized combustible gas is diluted to a concentration at which neither explosion nor fire occurs. With this method for handling a substance from which a combustible gas volatilizes, the combustible gas is diluted with air to a concentration at which neither explosion nor fire occurs, without using inactive gases such as nitrogen or carbon dioxide that have to be produced or purchased. Therefore, a substance from which a combustible gas volatilizes can be inexpensively and safely handled in operations such as mixing and storing.

20 Claims, 1 Drawing Sheet

U.S. PATENT DOCUMENTS

| | | | |
|---|---|---|---|
| 2,412,879 A * | 12/1946 | Fischer | 208/126 |
| 3,984,217 A * | 10/1976 | Huntington | 95/16 |
| 4,352,720 A * | 10/1982 | Weber et al. | 202/124 |
| 4,528,917 A * | 7/1985 | Jacobs | 110/300 |
| 4,715,810 A * | 12/1987 | Ramsey et al. | 432/8 |
| 5,117,771 A * | 6/1992 | Summers | 110/346 |
| 5,250,080 A * | 10/1993 | Michelena et al. | 44/575 |
| 5,259,358 A * | 11/1993 | Chen | 123/697 |
| 5,720,165 A * | 2/1998 | Rizzie et al. | 60/39.464 |
| 5,853,548 A * | 12/1998 | Piskorz et al. | 201/7 |
| 5,910,454 A * | 6/1999 | Sprules | 44/535 |
| 5,937,652 A * | 8/1999 | Abdelmalek | 60/648 |
| 6,145,599 A * | 11/2000 | Mumme | 169/66 |
| 6,245,390 B1 * | 6/2001 | Baranovski et al. | 427/449 |
| 6,553,924 B2 * | 4/2003 | Beaumont et al. | 110/238 |
| 6,832,485 B2 * | 12/2004 | Sugarmen et al. | 60/780 |
| 6,863,005 B2 * | 3/2005 | Lanier et al. | 110/345 |
| 6,887,389 B2 * | 5/2005 | Judd | 210/768 |
| 6,973,883 B1 * | 12/2005 | Annamalai et al. | 110/345 |
| 2005/0115465 A1 | 6/2005 | Sawaki et al. | |
| 2009/0031932 A1 * | 2/2009 | Mori et al. | 110/341 |
| 2010/0288172 A1 * | 11/2010 | Jukkola et al. | 110/204 |

FOREIGN PATENT DOCUMENTS

| | | |
|---|---|---|
| JP | 2002-323213 A | 11/2002 |
| JP | 2005-207684 A | 8/2005 |

\* cited by examiner

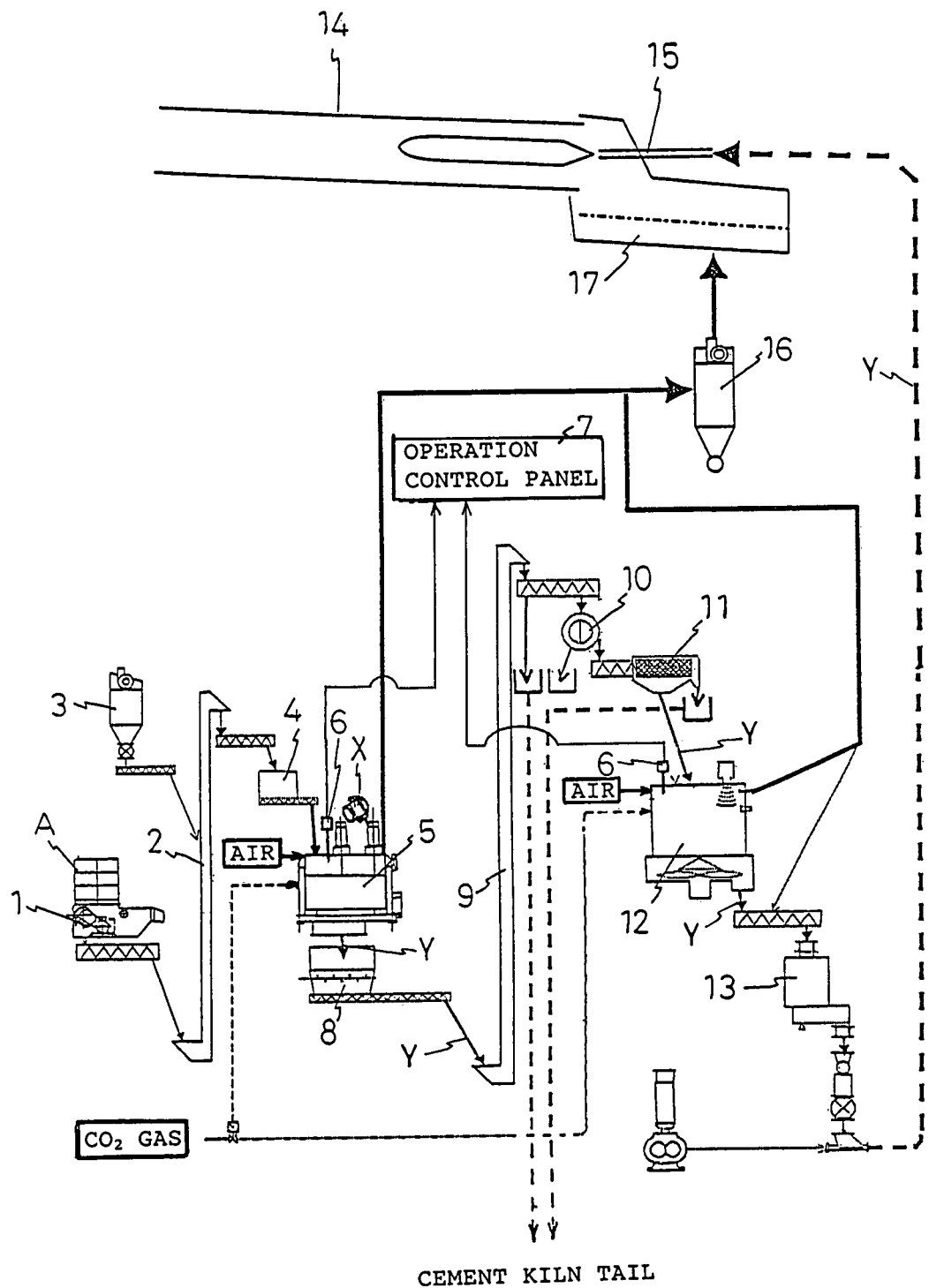

METHOD FOR HANDLING SUBSTANCE FROM WHICH COMBUSTIBLE GAS VOLATILIZES, METHOD FOR PRODUCING SOLID FUEL, METHOD FOR STORING SOLID FUEL, METHOD FOR USING SOLID FUEL, AND APPARATUS FOR USING SOLID FUEL

CROSS REFERENCE TO RELATED APPLICATIONS

This application is a U.S. national stage application of PCT/JP2007/054122 filed on Feb. 26, 2007, and claims priority to, and incorporates by reference, Japanese Patent Application No. 2006-55783 filed on Mar. 2, 2006.

TECHNICAL FIELD

The present invention relates to a method for handling a substance from which a combustible gas volatilizes, in particular a handling method for inexpensively and safely mixing and storing a substance from which a combustible gas volatilizes, a method for producing a solid fuel that uses the handling method, a method for storing the solid fuel, a method for using the solid fuel, and an apparatus for using the solid fuel.

BACKGROUND

An oil mud such as crude oil sludge has high energy. For this reason, the oil mud has been expected to be effectively used as fuel, instead of being incinerated or landfilled as an industrial waste.

However, an oil mud may have a high viscosity, or lack flowability at normal temperature, or the solid content may precipitate, separate, and be firmly fixed. This is why the oil mud has poor handleability in transportation via pipelines and is difficult to handle as a fuel.

Accordingly, in Europe, solid fuel has been produced in recent years by mixing an oil mud with sawdust, rather than using the oil mud alone. This solid fuel has been suggested for use as a substitution fuel for cement kilns. In Japan, similar methods for producing solid fuel or methods for incinerating oil-containing sludge have also been suggested (for example, Japanese Patent Applications Laid-open No. S54-39401 and 2002-323213).

However, when a viscous oil mud such as crude oil sludge is mixed with a biomass such as sawdust, a combustible gas volatilizes, creating a risk of explosion or inflammation.

Thus, because a mixing apparatus has a high degree of hermeticity, when an oil mud and a biomass are loaded into the mixing apparatus, air in an amount at least equal to the volume of the load is discharged from the mixing apparatus. Because the effluent gas from the mixing apparatus contains a large amount of dust, the effluent gas is sucked into a bag filter or the like so as to prevent the effluent gas from leaking to the outside of the apparatus. As a result of such suction, new air (oxygen content 21%) is introduced into the mixing apparatus, and a state with a high oxygen concentration is assumed inside the mixing apparatus. Because the lower explosive limit concentration of oxygen for most combustible gases is about 10%, where a combustible gas volatilizes inside the mixing apparatus, there is a high risk of explosion or inflammation due to a sufficient amount of oxygen.

Accordingly, a method for preventing explosion and inflammation has been employed by which the concentration of oxygen is reduced (to 8% or less) by blowing an inactive gas such as nitrogen or carbon dioxide into the mixing apparatus. However, such method requires that either the equipment for producing the inactive gas such as nitrogen or carbon dioxide be installed or the inactive gas be purchased and, therefore, the method cannot be implemented at a low cost. Another problem associated with this method is that the effluent gas containing the inactive gas and combustible gas has to be subjected to post-treatment.

When a substance from which a combustible gas volatilizes, such as a solid fuel that is the above-described oil mud or a mixture of an oil mud and a biomass, is stored in a container or apparatus with a high degree of hermeticity, there is also a risk of combustion or inflammation and a problem similar to the above-described problem is encountered.

DISCLOSURE OF THE INVENTION

The present invention was created in view of the above-described problems inherent to prior art, and it is an object of the present invention to provide a handling method for inexpensively and safely mixing and storing a substance from which a combustible gas volatilizes, a method for producing a solid fuel that uses the handling method, a method for storing the solid fuel, a method for using the solid fuel, and an apparatus for using the solid fuel.

In order to attain the above-described object, the present invention provides a method of the following configuration for handling a substance from which a combustible gas volatilizes, a method for producing a solid fuel that uses the handling method, a method for storing the solid fuel, a method for using the solid fuel, and an apparatus for using the solid fuel.

[1] A method for handling a substance from which a combustible gas volatilizes inside an apparatus with a high degree of hermeticity, wherein air is introduced into the apparatus with a high degree of hermeticity, and the substance from which a combustible gas volatilizes is handled in a state in which the volatilized combustible gas is diluted to a concentration at which neither explosion nor inflammation thereof occurs.

[2] The method for handling a substance from which a combustible gas volatilizes according to clause [1] above, wherein the air used for diluting the combustible gas is used as air for combustion.

[3] The method for handling a substance from which a combustible gas volatilizes according to clause [1] above, wherein the apparatus with a high degree of hermeticity is a mixing apparatus and handling of the substance from which a combustible gas volatilizes is a mixing operation.

[4] The method for handling a substance from which a combustible gas volatilizes according to clause [1] above, wherein the apparatus with a high degree of hermeticity is a storage apparatus and handling of the substance from which a combustible gas volatilizes is a storage operation.

[5] A method for producing a solid fuel, wherein an oil mud and a biomass are mixed by the handling method according to clause [3] above.

[6] A method for storing a solid fuel, wherein a solid fuel produced by mixing an oil mud and a biomass is stored by the handling method according to clause [4] above.

[7] A method for using a solid fuel, wherein a solid fuel produced by the method according to clause [5] above and/or a solid fuel stored by the method according to clause [6] above is loaded as a fuel into a burning furnace via a pipe, and air that has been used for diluting a combustible gas during solid fuel production and/or air that has been used for diluting a combustible gas during solid fuel storage is introduced as air for combustion via a pipe into the burning furnace.

[8] An apparatus for using a solid fuel, comprising a mixing apparatus that mixes an oil mud and a biomass, a pipe for introducing air that dilutes a combustible gas volatilized inside the mixing apparatus to a concentration at which neither explosion nor inflammation thereof occurs, a pipe for loading a solid fuel obtained by a mixing operation with the mixing apparatus as a fuel into a burning furnace, and a pipe for introducing the air used for diluting the combustible gas as air for combustion into the burning furnace.

With the above-described invention, a method is employed by which a combustible gas is diluted with air to a concentration at which neither explosion nor inflammation thereof occurs, without using inactive gases such as nitrogen or carbon dioxide that have to be produced or purchased. Therefore, a substance from which a combustible gas volatilizes can be inexpensively and safely handled in operations such as mixing and storing.

Further, in accordance with the present invention, air used for diluting the combustible gas is employed as air for combustion. Therefore, effluent gas from the handling apparatus such as mixing apparatus and storing apparatus can be treated safely and effectively. In addition, the calorific value of the combustible gas can be used effectively.

BRIEF DESCRIPTION OF THE DRAWING

FIG. 1 illustrates schematically equipment for producing a solid fuel in which the present invention is realized, and equipment for using the solid fuel.

BEST MODE FOR CARRYING OUT THE INVENTION

The present invention will be described below in greater detail with reference to an embodiment in which an oil mud and a biomass are mixed, a solid fuel is produced, and the solid fuel is used in a burning furnace.

[Oil Mud]

An oil mud can contain at least one from among oily substances such as oil sludges (for example, heavy oil sludge and crude oil sludge), waste oil regeneration residue (residue remaining after waste oil has been regenerated by using distillation equipment or the like), spent coating material, spent inks, spent solvents, grease, spent vegetable oils, spent edible oils, and dehydrated organic sludges.

Among them, oil sludges and waste oil regeneration residues are preferably used in accordance with the present invention. This is because these kinds of oil mud contain hydrocarbons with a large molecular weight as main components, have high viscosity, make it possible to separate solids easily, and are difficult to handle as fuels. Accordingly, these kinds of oil mud have been incinerated or landfilled and are, therefore, preferred for use in accordance with the present invention from the standpoint of improved utilization of wastes.

[Biomass]

Examples of biomass include crushed tatami (tatami waste), wood chips (for example, crushed wooden construction materials), wood dust, and sawdust.

Biomass is a general term for biologically derived organic resources (excluding fossil fuels) that can be used as fuels.

The tatami waste that is used as a starting material for crushed tatami may contain, at least partially, vegetable materials. More specifically, they include not only base tatami that use rice straws as a material for tatami floor, but also construction tatami that use polystyrene foam sheets (sheet-like molded bodies obtained by adding a foaming agent to a polystyrene resin composition and foaming) and insulation boards (for example, fiber insulation boards manufactured by a wet method in which a wood material is crushed in water, an adhesive agent or the like is added, and a paper forming process is implemented, followed by drying) as materials for a tatami floor, and straw sand tatami in which rice straws and polystyrene foam sheet are used as materials for tatami floor.

The aforementioned wood chips are crushed or powdered wood materials with a maximum particle size (mesh size for which the sieve residue is within 5 wt. %) more than 5 mm and equal to or less than 10 mm.

The wood powder is a powdered wood material with a maximum particle size (mesh size for which the sieve residue is within 5 wt. %) equal to or less than 5 mm.

The sawdust usually has a particle size distribution of about 0.5 to 5 mm.

The mean particle size (mesh size for which the sieve residue is within 50 wt. %) of the biomass is preferably equal to or larger than 0.5 mm. This is because when the mean particle size is less than 0.5 mm, the particulate system as a whole is reduced in size, flowability and dispersivity are degraded, and the effect of improving handleability is difficult to attain.

The maximum particle size of the biomass (mesh size for which the sieve residue is within 5 wt. %) is equal to or less than 10 mm, preferably equal to or less than 5 mm, and even more preferably equal to or less than 3 mm. This is because where the maximum particle size exceeds 10 mm, flame is difficult to induce when the biomass is used in a burner of a cement kiln and combustion continues even after the fuel has fallen on the cement clinker moving in the cement kiln. As a result, there is a risk of degrading the quality of cement clinker. Where the maximum particle size is equal to or less than 5 mm, it is preferable because the ratio of particles that burn on the cement clinker moving in the cement kiln is decreased and the solid fuel utilization ratio is increased.

[Other Materials]

Organic powders can be used in addition to the biomass as oil mud absorbents. Other materials can be also compounded, provided that the quality is not degraded.

Examples of organic powders include toners, heavy oil ash, finely powdered coal, activated coal powder, meat-and-bone meal, powdered plastic wastes, powdered paper, and powdered organic distillation residues. These organic powders may be used individually or in combinations of two or more thereof.

The toner is a dry developing agent for business machines such as copiers, facsimile machines, and printers and has a particle size of 7 $\mu$m to 11 $\mu$m. Usually, spent toners, which are wastes, are used. The toner has a very small particle size and narrow particle size distribution. For this reason, it is preferred that the toners be used because they can make significant contribution to the increase in the specific gravity of the produced solid fuel and increase in the amount of oil mud that can be used.

The heavy oil ash is a powder having a small particle size of about 1 $\mu$m to 30 $\mu$m. For this reason, it is also preferred that the heavy oil ash be used because it can make significant contribution to the increase in the specific gravity of the produced solid fuel and increase in the amount of oil mud that can be used.

The finely powdered coal is a powder having a particle size of about 10 $\mu$m to 100 $\mu$m and is known as a solid fuel for burning furnaces such as cement kilns.

The activated coal powder and meat-and-bone meal are usually used in the form of powders with a mean particle size equal to or less than 1 mm. The powdered plastic wastes are, for example, spent pellets. The powdered paper is, for example, sander dust. For example, phthalic acid distillation residues can be used as the powdered organic distillation residues.

The ratio of the mean particle size of the organic powder to that of the biomass is equal to or less than ½, preferably equal to or less than ⅓. This is because when the ratio is more than ½, the difference in particle size between the biomass and organic powder decreases and the effect of improving handleability is difficult to attain.

Where the mean particle size of active carbon powder composed of solid carbon in the organic powder exceeds 300 μm, the number of particles that are combusted after reaching the furnace bottom increases and the quality of cement clinker sometimes degrades. For this reason, it is preferred that the organic powder have an average particle size of 300 μm or less, more preferably 100 μm or less. The lower limit for the particle size of the organic powder is not particularly limited, but usually is equal to or larger than 1 μm.

[Compounding Ratio]

As for the compounding ratio of the above-described materials, first, the mass ratio of the biomass serving as an absorbing material and the organic powder is 40/60 to 95/5, preferably 50/50 to 80/20. This is because where the weight ratio of the biomass and organic powder is less than 40/60, because the compounded amount of biomass is small, gaps between biomass particles are filled with the organic powder and flowability of fuel can be greatly decreased. Conversely, where the weight ratio of the biomass and organic powder exceeds 95/5, because the compounded amount of organic powder is small, a sufficient effect of increasing the specific gravity of fuel cannot be attained.

The compounded amount of oil mud is 30 to 300 parts by weight, preferably 50 to 200 parts by weight, more preferably 80 to 150 parts by weight, and even more preferably 100 to 140 parts by weight per a total of 100 parts by weight of the biomass and organic powder. This is because when the compounded amount of oil mud is less than 30 parts by weight, the object of using the oil mud as a fuel is not met. Conversely, where the compounded amount of oil mud exceeds 300 parts by weight, oil remains on the particle surface in the produced solid fuel, the particle surface becomes glossy and adhesive, and handleability thereof may be degraded.

[Mixing]

Mixing is performed by loading the above-described materials into a mixing apparatus at the above-described compounding ratios, while employing the method for handling a substance from which a combustible gas volatilizes in accordance with the present invention, that is, while introducing air into the mixing apparatus and diluting the combustible gas volatilized from the mixture to a concentration at which neither combustion nor inflammation thereof occurs.

Where the above-described oil mud and biomass are mixed, combustible gases such as toluene, alcohols, and acetic acid esters volatilize from the mixture, in particular spent coating materials and chemical sludges, and there is a risk of the combustible gases being ignited by a spark generated, e.g., in a rotary portion of the mixing apparatus, thereby causing explosion or inflammation. For example, because the lower explosive limit concentration of toluene is 1.27%, where the toluene is present inside the mixing apparatus in a concentration above this limit, there is a risk of explosion or inflammation.

Thus, in accordance with the present invention, air is introduced into the mixing apparatus and the concentration of the volatilized combustible gases is diluted to a level at which neither explosion nor inflammation thereof occurs. The specific amount of air introduced into the mixing apparatus can be appropriately determined by the type and amount of combustible gas volatilized from the mixture and also by the capacity of the mixing apparatus, amount of mixture, and the like. However, because the diluting gas used in accordance with the present invention is cost-free air and also because the air used for diluting the combustible gas in accordance with the present invention can be used in a large amount, as will be described below, as air for combustion in the burning furnace, the necessary and sufficient amount of air can be introduced into the mixing apparatus.

The mixing apparatus preferably has a structure in which the mixing container itself rotates, rather than a structure provided with a stirring impeller. This is because the self-rotating mixing container enables good mixing of materials with a high viscosity such as oil mud and materials with a low bulk density such as a biomass. Further, the rotation of the container causes the volatilized combustible gases to flow, thereby preventing them from remaining in part of the container. As a result, the combustible gases are easily and reliably diluted by the introduced air.

An intensive mixer manufactured by Eirich Co. is an example of mixing apparatus with a structure in which the container itself is rotated.

It is also preferred that the mixing apparatus be provided with a combustible gas detector for detecting the concentration of combustible gases at all times. Further, from the standpoint of enabling the reliable prevention of accidents such as explosion and inflammation, it is preferred that a configuration be further provided such that when the combustible gas detector detects combustible gases at a concentration above a predetermined level, the mixing operation is immediately terminated and the amount of air introduced into the mixing apparatus is increased, or an inactive gas such as carbon dioxide is introduced into the mixing apparatus.

[Storage of Solid Fuel]

As a result of the above-described operation of mixing the oil mud and biomass, the oil mud is absorbed by the biomass and a solid fuel with good handleability can be produced.

When this solid fuel is stored, air is introduced into the tank where the solid fuel is stored and combustible gases generated from the solid fuel are diluted to a concentration at which neither explosion nor inflammation thereof occurs.

Because the solid fuel is a mixture of oil mud and biomass, combustible gases can be generated from the mixture and a spark can be ignited in the combustible gases, thereby creating the risk of explosion or inflammation.

Accordingly, the method for handling a substance from which a combustible gas volatilizes in accordance with the present invention is employed, that is, air is introduced into the storage tank and the concentration of generated combustible gases is reduced to a level at which neither explosion nor inflammation of the combustible gases occurs, in other words, to below the lower explosive limit concentration. The specific amount of air introduced into the storage tank is appropriately determined by the amount of the volatilized combustible gases, capacity of the storage tank, and the like, in the same manner as during mixing. However, because the diluting gas used in accordance with the present invention is cost-free air and also because the air used for diluting the combustible gas in accordance with the present invention can be used in a large amount, as described hereinbelow, as air for combustion in the burning furnace, the necessary and sufficient amount of air can be introduced into the storage tank.

The aforementioned storage of solid fuel includes not only the long-term storage, but also the case in which the produced solid fuel is stored in a metering tank to be used immediately after the producing.

Similarly to the above-described case of mixing apparatus, it is preferred that the storage tank be provided with a combustible gas detector for detecting the concentration of combustible gases at all times. Further, from the standpoint of enabling the reliable prevention of accidents such as explosion, it is preferred that a configuration be further provided such that when the combustible gas detector detects combustible gases at a concentration above a predetermined level, the amount of air introduced into the storage tank is increased, or an inactive gas such as carbon dioxide is introduced into the storage tank.

[Use of Solid Fuel]

A method for using the solid fuel that has thus been produced and stored is, for example, a method by which the solid fuel is loaded via a pipe into a burning furnace and combusted as fuel.

In this case, a configuration is preferred in which the air that has been used when the solid fuel was produced and/or stored, more specifically, the air used for diluting the combustible gases during mixing of oil mud and biomass, or the air used for diluting the combustible gases during storage of solid fuel, be supplied as air for combustion into the burning furnace. As a result, a large amount of effluent gases containing combustible gases from the mixing apparatus or storage tank can be treated safely and effectively, and the calorific value of combustible gases can be used effectively.

Examples of burning furnaces include a cement kiln for manufacturing clinker and kilns for calcining quicklime or lightweight aggregates.

[Examples]

Specific examples of the method for handling a substance from which a combustible gas volatilizes in accordance with the present invention, method for producing a solid fuel that uses the handling method, method for storing the solid fuel, method for using the solid fuel, and apparatus for using the solid fuel will be explained below with reference to the appended drawings.

FIG. 1 illustrates schematically the equipment for producing the solid fuel and equipment for using the solid fuel.

As shown in the figure, first, one batch of tatami waste A that has been weighed by a predetermined method is loaded into a crusher 1 and crushed to obtain a crushed material in which the ratio of a crushed material having a length equal to or less than 5 cm is equal to or more than 80 wt. %. The obtained crushed material of the tatami waste A is transported by a conveyor 2. In this process, an organic powder (toner, heavy oil ash) is supplied at a constant rate from a storage apparatus 3 thereof, and a mixture of the two components is stored in a hopper 4.

The crushed material (about 200 kg) of one batch of tatami waste A that is stored in the hopper 4 is loaded together with one batch of oil mud (heavy oil sludge about 200 kg) X into a mixing apparatus (Eirich Mixer, manufactured by Eirich Co.), and stirring and mixing are performed within the predetermined interval (about 4 min). In this case, the predetermined amount (about 20 m$^3$/min) of air is introduced into the mixing apparatus 5 and the mixing operation is performed, while diluting the combustible gases volatilized from the mixture to a concentration at which neither explosion nor inflammation thereof occurs. Further, a combustible gas detector 6 is installed in the mixing apparatus 5 and an operation control panel 7 is provided such that when a concentration of combustible gases above a predetermined level is detected, control is performed to interrupt immediately the mixing operation and introduce $CO_2$ gas into the mixing apparatus 5.

As a result of the mixing operation, the oil mud X is absorbed by the solid material such as the crushed material of tatami waste A mixed therewith and solid fuel is obtained. The solid fuel Y discharged from the mixing apparatus 5 is disintegrated in a disintegrator 8 installed downstream of the mixing apparatus 5 and the crushed solid fuel is transported upward by a conveyor 9. Foreign matter is removed in a drum magnetic separator 10, the particle size is adjusted with a trommel 11, and the solid fuel is stored in a storage tank 12.

The predetermined amount (maximum about 30 m$^3$/min) of air is introduced into the storage tank 12 and stored therein, while the combustible gases generated from the solid fuel Y is being diluted to a concentration at which neither explosion nor inflammation thereof occurs. Similarly to the above-described mixing apparatus 5, the storage tank 12 is provided with a combustible gas detector 6 and the operation control panel 7 is connected so that when a concentration of combustible gases above a predetermined level is detected, control is performed to introduce $CO_2$ gas into the storage tank 12. The solid fuel Y that is stored in such a state is weighed with a weighing machine 13, pumped by air as a replacement for a finely powdered coal that is the main fuel of a cement kiln 14, or together with the finely powdered coal, toward a burner 15, and loaded into the cement kiln 14 from the fuel injection nozzle of the burner 15.

The solid fuel Y loaded into the cement kiln 14 is completely combusted by the flame from the burner 15 within a short period before reaching the furnace bottom, and the combustion residue of solid fuel becomes a clinker component. Further, the air that has been used for diluting the combustible gases discharged from the mixing apparatus 5 is guided together with the air that has been used for diluting the combustible gases discharged from the storage tank 12 to a clinker cooler 17 via a bag filter 16. This air is used for cooling the clinker and also as air for combustion in the cement kiln 14.

On the other hand, foreign matter or the like that was contained in the solid fuel and was separated in the drum magnetic separator 10 and trommel 11 is loaded from a tail end of the cement kiln 14 and used as fuel. The residue thereof becomes a clinker component.

Examples of the method for handling a substance from which a combustible gas volatilizes in accordance with the present invention, method for producing a solid fuel that uses the handling method, method for storing the solid fuel, method for using the solid fuel, and apparatus for using the solid fuel are explained above, but the present invention is not limited to the above-described examples and various changes and modifications can be made within the technical scope of the present invention defined by the claims.

INDUSTRIAL APPLICABILITY

With the above-described method for handling a substance from which a combustible gas volatilizes in accordance with the present invention, a method is employed by which combustible gases are diluted by air to a concentration at which neither explosion nor inflammation thereof occurs, without using inactive gases such as nitrogen or carbon dioxide that have to be produced or purchased. Therefore, the substance from which a combustible gas volatilizes can be inexpensively and safely handled in operations such as mixing and storing.

Further, in accordance with the present invention, the air used for diluting the combustible gases is used as air for combustion. Therefore, effluent gases from handling apparatuses such as mixing apparatus and storage apparatus can be treated safely and effectively. Further, the caloric value of combustible gases can be used effectively.

The invention claimed is:

1. A method for handling a substance from which a combustible gas volatilizes inside an apparatus with a high degree of hermeticity, which comprises steps of:
   mixing, in a mixing apparatus having a high degree of hermeticity, a mixture comprising air, oil mud and oil mud absorbent, the oil mud absorbent being selected from the group consisting of biomass, organic powders and mixtures thereof, the mixing including:
      volatilizing a combustible gas contained within the oil mud mixed with the air and biomass, while introducing the air into the mixing apparatus and diluting the volatilized combustible gas to a concentration that diminishes exploding or igniting of the combustible gas, and the air being introduced into the apparatus with a high degree of hermeticity, and
      forming a solid fuel from the mixture comprising oil mud and oil mud absorbent,
   transporting the solid fuel from the mixing apparatus using pneumatic pressure to a cement kiln,
   burning the solid fuel in a burner of the cement kiln and converting the solid fuel into a clinker, and
   feeding air exiting from the mixing apparatus, which was used for diluting the combustible gas, into the cement kiln and cooling the clinker formed therein using the air from the mixing apparatus.

2. The method for handling a substance from which a combustible gas volatilizes according to claim 1, wherein the air exiting the mixing apparatus is also used as combustion gas in the burner of the cement kiln.

3. The method for handling a substance from which a combustible gas volatilizes according to claim 1, wherein an amount of the oil mud is 30 to 300 parts by weight per total 100 parts by weight of the oil mud absorbent.

4. The method for handling a substance from which a combustible gas volatilizes according to claim 1, wherein the mixture in the mixing step includes the biomass and the organic powder in a mass ratio of biomass/organic powder of 40/60 to 95/5, the organic powder has a mean particle size equal to or less than one half that of the biomass, an amount of the oil mud is 30 to 300 parts by weight per total 100 parts by weight of the biomass and the organic powder, and the biomass has an average particle size of 0.5 to 10 mm.

5. The method for handling a substance from which a combustible gas volatilizes according to claim 4, wherein the oil mud is selected from the group consisting of oil sludge, waste oil regeneration residue, spent coating material, spent inks, spent solvents, grease, spent vegetable oils, spent edible oils and dehydrated organic sludge.

6. The method for handling a substance from which a combustible gas volatilizes according to claim 4, wherein the biomass is obtained from biologically derived organic resources usable as a fuel and excluding fossil fuels.

7. The method for handling a substance from which a combustible gas volatilizes according to claim 4, wherein the biomass is selected from the group consisting of tatami waste, vegetable materials, polystyrene foam sheets, insulation boards, crush wood material, paper, wood chips and powdered wood materials.

8. The method for handling a substance from which a combustible gas volatilizes according to claim 4, wherein the organic powder is selected from the group consisting of toners, heavy oil ash, finely powdered coal, activated coal powder, meat-and-bone meal, powdered plastic wastes, powdered paper, powdered organic distillation residues and combinations thereof.

9. A method for handling a substance from which a combustible gas volatilizes inside an apparatus with a high degree of hermeticity, which comprises steps of:
   storing, in a storage apparatus having a high degree of hermeticity, a solid fuel formed from a mixture comprising air, oil mud and oil mud absorbent, the oil mud absorbent being selected from the group consisting of biomass, organic powders and mixtures thereof, and volatilizing a combustible gas contained within the mixture, while introducing the air into the mixing apparatus and diluting the volatilized combustible gas to a concentration that diminishes exploding or igniting of the combustible gas, and the air being introduced into the storage apparatus with a high degree of hermeticity, and
   transporting the solid fuel from the storage apparatus using pneumatic pressure to a cement kiln,
   burning the solid fuel in a burner of the cement kiln and converting the solid fuel into a clinker, and
   feeding air exiting from the storage apparatus, which was used for diluting the combustible gas, into the cement kiln and cooling the clinker with the air from the storage apparatus.

10. The method for handling a substance from which a combustible gas volatilizes according to claim 9, wherein the air exiting the storage apparatus is also used as combustion gas in a burner of the cement kiln.

11. The method for handling a substance from which a combustible gas volatilizes according to claim 9, wherein an amount of the oil mud is 30 to 300 parts by weight per total 100 parts by weight of the oil mud absorbent.

12. The method for handling a substance from which a combustible gas volatilizes according to claim 9, wherein the mixture includes the biomass and the organic powder in a mass ratio of biomass/organic powder of 40/60 to 95/5, the organic powder has a mean particle size equal to or less than one half that of the biomass, an amount of the oil mud is 30 to 300 parts by weight per total 100 parts by weight of the biomass and the organic powder, and the biomass has an average particle size of 0.5 to 10 mm.

13. The method for handling a substance from which a combustible gas volatilizes according to claim 12, wherein the oil mud is selected from the group consisting of oil sludge, waste oil regeneration residue, spent coating material, spent inks, spent solvents, grease, spent vegetable oils, spent edible oils and dehydrated organic sludge.

14. The method for handling a substance from which a combustible gas volatilizes according to claim 12, wherein the biomass is obtained from biologically derived organic resources usable as a fuel and excluding fossil fuels.

15. The method for handling a substance from which a combustible gas volatilizes according to claim 12, wherein the biomass is selected from the group consisting of tatami waste, vegetable materials, polystyrene foam sheets, insulation boards, crush wood material, paper, wood chips and powdered wood materials.

16. The method for handling a substance from which a combustible gas volatilizes according to claim 12, wherein the organic powder is selected from the group consisting of toners, heavy oil ash, finely powdered coal, activated coal powder, meat-and-bone meal, powdered plastic wastes, powdered paper, powdered organic distillation residues and combinations thereof.

17. A method for handling a substance from which a combustible gas volatilizes inside an apparatus with a high degree of hermeticity, which comprises steps of:

mixing, in a mixing apparatus having a high degree of hermeticity, a mixture comprising air, oil mud and an oil mud absorbent, the oil mud absorbent being selected from the group consisting of biomass, organic powders and mixtures thereof, the mixing including:

volatilizing a combustible gas contained within the oil mud mixed with the air and biomass, while introducing the air into the mixing apparatus and diluting the volatilized combustible gas to a concentration that diminishes exploding or igniting of the combustible gas, and the air being introduced into the apparatus with a high degree of hermeticity, and forming a solid fuel from the mixture comprising oil mud and oil mud absorbent in the mixing apparatus, storing, in a storage apparatus having a high degree of her hermeticity, the solid fuel from the mixing apparatus air;

volatilizing a combustible gas contained within the solid fuel, while introducing the air in an amount sufficient for diluting the volatilized combustible gas to a concentration at which neither exploding nor igniting of the combustible gas occurs, and the air being introduced into the storage apparatus with a high degree of hermeticity, transporting the solid fuels from the mixing and storage apparatuses using pneumatic pressure to a cement kiln, burning the solid fuels in a burner of the cement kiln and converting the solid fuels into a clinker, and feeding air exiting from the mixing and storage apparatuses, which were used for diluting the combustible gas, into the cement kiln and cooling of the clinker using the air from the mixing and storage apparatuses.

18. The method for handling a substance from which a combustible gas volatilizes according to claim 17, wherein the mixture in the mixing step includes the biomass and the organic powder in a mass ratio of biomass/organic powder of 40/60 to 95/5, the organic powder has a mean particle size equal to or less than one half that of the biomass, an amount of the oil mud is 30 to 300 parts by weight per total 100 parts by weight of the biomass and the organic powder, and the biomass has an average particle size of 0.5 to 10 mm.

19. The method for handling a substance from which a combustible gas volatilizes according to claim 18, wherein the oil mud is selected from the group consisting of oil sludge, waste oil regeneration residue, spent coating material, spent inks, spent solvents, grease, spent vegetable oils, spent edible oils and dehydrated organic sludge.

20. The method for handling a substance from which a combustible gas volatilizes according to claim 18, wherein the biomass is obtained from biologically derived organic resources usable as a fuel and excluding fossil fuels.

* * * * *